Patented Aug. 7, 1928.

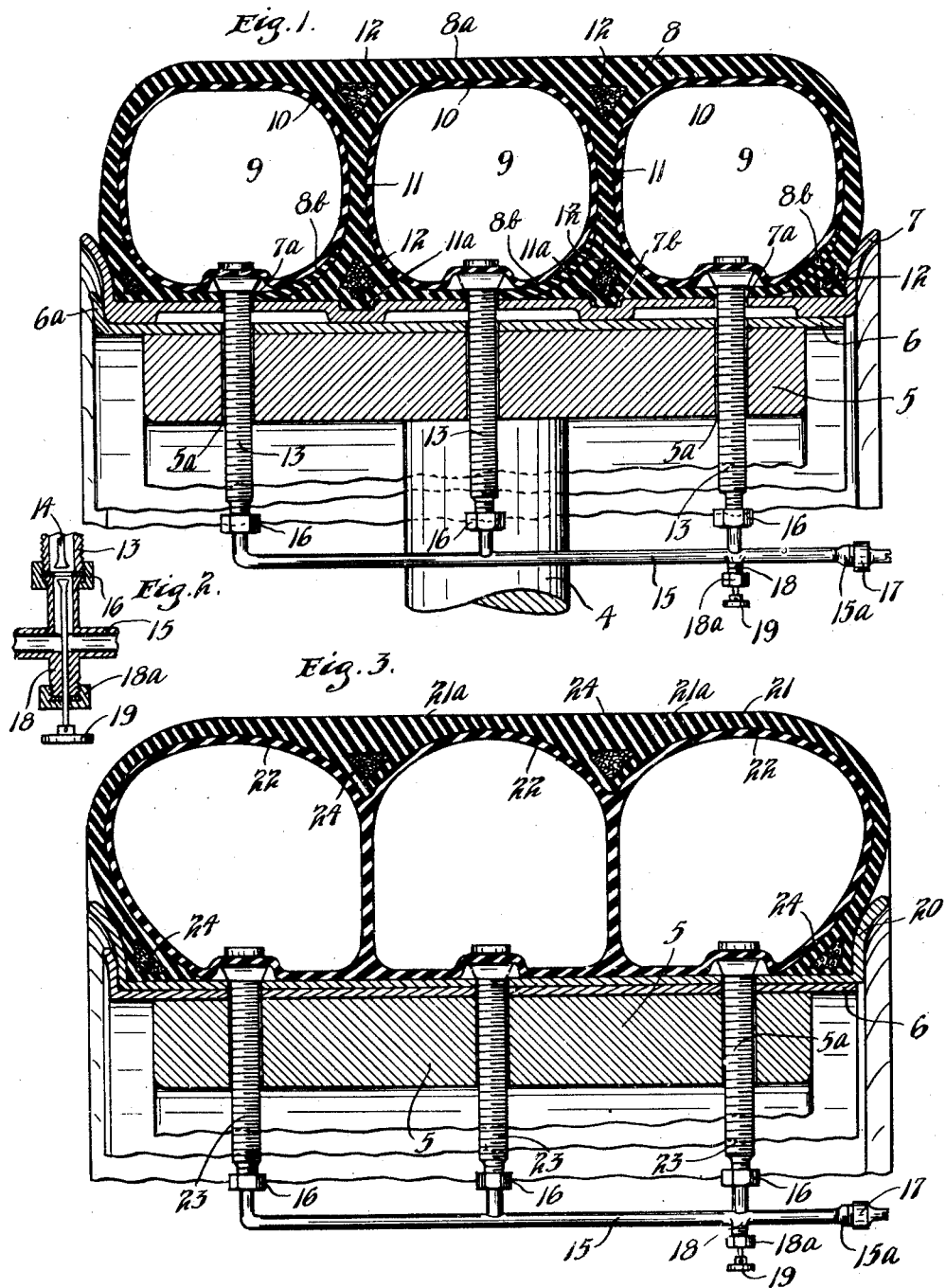

1,679,444

UNITED STATES PATENT OFFICE.

BENJAMIN F. PAGENHART, OF MINNEAPOLIS, MINNESOTA, ASSIGNOR OF ONE-FOURTH TO J. A. BOCINNY, OF MINNEAPOLIS, MINNESOTA.

MULTIPLE-TUBE TIRE.

Application filed December 3, 1925. Serial No. 72,955.

This invention relates to vehicle tires and especially to pneumatic tires for motor vehicles.

It is the main object of this invention to provide a simple but highly efficient vehicle tire provided with a multiplicity of vertically spaced inner tubes disposed within a single casing, whereby a large amount of traction surface may be secured relative to the distance between the rim and the tread of the tire and whereby, although one of the tubes becomes punctured, the vehicle may be run for a considerable distance without injury to the tire.

A further object of the invention is to provide such a tire capable of supporting extremely heavy loads but nevertheless requiring only a relatively small amount of material in the manufacture thereof. Applicant's tire affords a wide, relatively flat tread equal in traction to standard tires on the market at this time of several times the size and diameter thereof.

It is an additional object to provide in combination with a vehicle wheel and demountable rim therefor, a pneumatic tire having a relatively wide casing provided with a substantially flat tread and a plurality of horizontally alined compartments therein of approximately circular cross section, means also being included for preventing lateral slippage of said casing when the tube within a certain compartment is punctured.

It is a still further object of this invention to provide in such a tire, means for reenforcing and holding the several compartments in proper spaced relation when one of the tubes is punctured, and also means for jointly filling the several tubes and approximately testing the air pressure therewithin.

These and other objects of the invention will be apparent from the following description made in connection with the accompanying drawings wherein like characters refer to similar parts throughout the several views, and in which:

Fig. 1 is a vertical cross section of the preferred form of the invention mounted on the felly of a vehicle wheel;

Fig. 2 is a vertical section on a larger scale of the mechanism for testing the air pressure in the tubes of said tire; and Fig. 3 is a vertical cross section of a modified form of the invention.

In the preferred form of the invention illustrated in Figs. 1 and 2, the spokes and felly of a vehicle wheel are indicated by the numerals 4 and 5, respectively. Felly 5 is relatively wide in comparison with most standard fellies on the market at the present time, and is, moreover, provided with three radially disposed apertures 5ª therethrough to accommodate the valve sleeves of the several tubes employed in this invention. The fixed rim 6 is mounted on the periphery of felly 5 having the usual flange 6ª at its inner side and a demountable tire rim 7 is shown mounted on fixed rim 6 and provided with three apertures 7ª adapted to be alined with apertures 5ª in the felly. Demountable rim 7 is, moreover, provided with a pair of spaced annular grooves 7ᵇ on the outer side thereof preferably dividing the width of said rim in three equal parts. The demountable rim 7 may be of broken, split or hinged construction to permit attachment to fixed rim 6 with facility.

The casing 8 of the tire comprises a relatively wide annular member of substantially oblong cross section. Within this casing a plurality of annular preferably horizontally alined compartments 9 are formed being open at their inner sides to permit a plurality of inflatable inner tubes 10 to be inserted therein. Compartments 9 are formed by means of two vertically spaced annular partitions 11 preferably integral with said casing and extending from the wide tread portion 8ª to the demountable rim 7. The edges of the partitions are provided with inwardly projecting annular flanges 11ª adapted to be seated in the grooves 7ᵇ of the rim 7. Compartments 9 are substantially circular in area and of relatively small diameter. The rim side of each compartment is closed by means of a flexible flap 8ᵇ integral with one of the adjacent walls of casing 8 and diminishing in thickness at its free end. These flaps are adapted to be tucked in about the inner tubes 10 when the same are inserted in casing 8, conforming to the shape of the adjacent wall or partition of the casing.

A plurality of wires or re-enforcing material 12 is imbedded in casing 8, encircling said casing and the outer and inner portions of partition 11 and also in the bead portions of the casing.

Inner tubes 10 are provided with the usual valve sleeves or tubes 13 adapted to project through rims 6 and 7 and through the felly to the inner side of the wheel. Valves 14 are housed within said valve tubes and the outer ends of valve tubes 13 are connected by means of a conduit 15 provided with suitable packing nuts or unions 16. Conduit 16 is open at its outer side and provided with the usual removable cap 17.

A boss 18 is formed on the one side of conduit 15 having an aperture therethrough vertically alined with one of the valves 14. A relatively small plunger 19 is slidably journaled in the bore or aperture of said boss adapted to contact the extremity of valve 14 to unseat the same and permit air to be withdrawn from the inner tube on which applied. Boss 18 carries a small packing box 18ᵃ forming a tight connection between plunger 19 and the outer end of its guide.

It will be seen that applicant's improved tire affords a very large substantially flat traction area although requiring only a minimum amount of material. Although the distance from the tread to the rim in the improved tire is relatively short, compared with the diameter of most tires affording large tread surfaces, applicant's tire will, nevertheless, support very heavy loads due to the fact that a multiplicity of inner tubes of relatively small diameter are encased in substantially horizontal alignment within the casing. The small diameter of these tubes and the compartments in which they are housed permits said tubes to carry air under high pressure, while, jointly, they are able to sustain very heavy loads. If one of the tubes is punctured or blows out, the remaining tubes within casing 8 will be ample to carry a comparatively heavy load for a considerable distance without injury to the tire. Since the several compartments 9 are provided with relatively heavy walls, re-enforced at points receiving the greatest strain, the casing will not slip or become displaced when one of the tubes is punctured. Engagement of flanges 11ᵃ with grooves 7ᵇ of the rim, as well as the re-enforcement afforded by flaps 8ᵇ, hold the casing in proper shape at all times and prevent slippage of the same when a puncture occurs.

The approximate air pressure of the several tubes may be tested by applying a standard tester to the open end 15ᵃ of conduit 15 and depressing the handle of plunger 19. This testing mechanism may, of course, be applied to the other valves in the several tubes, but, for general purposes, the single device is sufficient inasmuch as the tubes will not vary widely in their air pressure and if the tires are filled often the tube having the least amount of air therein will tend to receive more air than the other tubes until the pressure in the several tubes are approximately equalized. By testing at this time, the approximate air pressure of the several tubes may be read from the single tube on which the tester is applied. If desired the conduit 5 may be detached from the several valve sleeves by unscrewing packing nuts 16 and the several tubes may be then filled or tested individually.

The modified device illustrated in Fig. 3 is similar in many respects to the form above described. The felly of the wheel 5 and the fixed rim 6 are identical with those illustrated in Fig. 1 and are provided with the alined radially disposed apertures therethrough. The demountable rim 20 employed in this form is substantially the same as the rim in Fig. 1 although the same is not provided with horizontally spaced grooves. In this form a casing 21 is provided having a wide relatively flat tread portion spaced a relatively short distance from the rim 20. Annular grooves are formed on the inner sides of casing 21 by means of the inwardly extending vertically spaced corrugations 21ᵃ. An annular tube is employed having a plurality of horizontally alined air compartments 22, each adapted to be supplied with air through separate valve sleeves or conduits 23 extending through the rims and felly of the wheel. The inner tube is housed within casing 21, the several compartments 22 thereof being held in proper position by means of corrugations 21ᵃ encircling the inner side of the tread portion. The casing 21 is re-enforced by means of wires or other material 24 imbedded in the corrugations 21ᵃ and in the bead portions of casing 21. As in the form shown in Fig. 1, the several air supply conduits or valve sleeves 23 are connected by means of conduit 15 provided with the open end 15ᵃ, and the testing mechanism comprising the apertured boss 18, the plunger 19 and packing box 20. The inner or bottom sides of the several compartments 22 of the inner tube engage the outer periphery of the rim 20.

In this form of the invention, as in the preferred form, although a single compartment or air container is punctured, the tire may be used for a considerable distance thereafter, and the large amount of traction surface is provided without necessitating the casings of tremendous proportions.

From the above description, it will be seen that applicant has invented a simple but highly efficient multi-tube vehicle tire adapted for wide general usage, capable of supporting heavy loads and provided with a very large substantially flat area of traction surface.

It will, of course, be understood that various changes may be made in the form, details and arrangement of parts within the scope of the appended claims without departing from the present invention.

What is claimed is:

1. A tire casing comprising curved side walls and a relatively wide tread portion, said tread portion being provided with a plurality of substantially unyielding inwardly projecting partitions to form inner tube chambers, said partitions and one of said side walls being provided with lateral extensions respectively overlapping one side wall and adjacent partitions to engage and support the same to retain the same in position.

2. A tire casing comprising sides and a relatively wide tread portion, said tread portion being provided with a substantially unyielding inwardly projecting partition to form with said sides the walls of inner tube chambers, certain of said walls being provided with lateral extensions overlapping adjacent walls to engage the adjacent walls and support and retain the same in position.

In testimony whereof I affix my signature.

BENJAMIN F. PAGENHART.